(12) United States Patent
Stafford et al.

(10) Patent No.: US 9,602,806 B1
(45) Date of Patent: Mar. 21, 2017

(54) STEREO CAMERA CALIBRATION USING PROXIMITY DATA

(71) Applicant: Amazon Technologies, Inc., Reno, NV (US)

(72) Inventors: David W. Stafford, Cupertino, CA (US); Jennifer Silva, Los Altos, CA (US); Edward Ackley Falk, Mountain View, CA (US); Robert King Myers, Santa Cruz, CA (US)

(73) Assignee: Amazon Technologies, Inc., Reno, NV (US)

( * ) Notice: Subject to any disclaimer, the term of this patent is extended or adjusted under 35 U.S.C. 154(b) by 762 days.

(21) Appl. No.: 13/914,469

(22) Filed: Jun. 10, 2013

(51) Int. Cl.
| | |
|---|---|
| *H04N 13/02* | (2006.01) |
| *H04N 13/00* | (2006.01) |
| *H04N 19/597* | (2014.01) |
| *G06T 7/00* | (2006.01) |
| *H04N 13/04* | (2006.01) |

(52) U.S. Cl.
CPC ....... *H04N 13/0246* (2013.01); *H04N 13/004* (2013.01); *H04N 13/0055* (2013.01); *H04N 13/0059* (2013.01); *H04N 19/597* (2014.11); *G06T 7/0075* (2013.01); *G06T 2207/10012* (2013.01); *H04N 13/0431* (2013.01); *H04N 13/0445* (2013.01)

(58) Field of Classification Search
CPC ........... H04N 13/0246; H04N 13/0011; H04N 13/0055; H04N 2013/0081
USPC ................................... 348/47, 135, 153, 169
See application file for complete search history.

(56) References Cited

U.S. PATENT DOCUMENTS

| | | | | |
|---|---|---|---|---|
| 6,262,743 | B1 * | 7/2001 | Allio | H04N 13/0014 345/427 |
| 7,027,659 | B1 * | 4/2006 | Thomas | H04N 13/0003 348/E13.008 |
| 8,831,335 | B2 * | 9/2014 | Koizumi | G06T 7/0075 382/154 |
| 9,303,982 | B1 * | 4/2016 | Ivanchenko | G01B 11/22 |
| 9,465,444 | B1 * | 10/2016 | Ramaswamy | G06F 3/017 |
| 2006/0013473 | A1 * | 1/2006 | Woodfill | G06K 9/32 382/154 |
| 2007/0296815 | A1 * | 12/2007 | Isaksson | G06T 7/20 348/157 |
| 2008/0144924 | A1 * | 6/2008 | Hoffmann | G06T 7/002 382/154 |
| 2008/0239393 | A1 * | 10/2008 | Navon | G06T 7/0075 358/1.16 |
| 2010/0283845 | A1 * | 11/2010 | Yokochi | G06K 9/00805 348/135 |

(Continued)

*Primary Examiner* — Helen Shibru
(74) *Attorney, Agent, or Firm* — Polsinelli LLP (57) ABSTRACT

Approaches discussed herein enable a computing device, such as a phone or tablet computer, to automatically recalibrate cameras used to capture three-dimensional images. A proximity sensor can be used to determine the distance to an object at approximately the time that three-dimensional image data is captured that includes a representation of the object. The apparent distance to the object, from the disparity of the three-dimensional image data, can be compared against the detected distance as measured by the proximity sensor. The difference between the detected and apparent distance, or the corresponding disparity values, can be used to determine a relative misalignment among the cameras, when then can be used to update the appropriate calibration parameters.

19 Claims, 8 Drawing Sheets

(56) References Cited

U.S. PATENT DOCUMENTS

| | | | |
|---|---|---|---|
| 2011/0043620 A1* | 2/2011 | Svanholm | G01C 1/04 |
| | | | 348/135 |
| 2011/0229013 A1* | 9/2011 | Huang | G06T 7/002 |
| | | | 382/154 |
| 2012/0200670 A1* | 8/2012 | Pockett | H04N 13/0203 |
| | | | 348/46 |
| 2014/0160247 A1* | 6/2014 | Shi | H04N 13/0239 |
| | | | 348/47 |
| 2014/0168377 A1* | 6/2014 | Cluff | G06T 7/002 |
| | | | 348/47 |
| 2014/0168424 A1* | 6/2014 | Attar | G01C 3/10 |
| | | | 348/140 |
| 2014/0350338 A1* | 11/2014 | Tanaka | A61B 1/00009 |
| | | | 600/111 |

* cited by examiner

FIG. 10

STEREO CAMERA CALIBRATION USING PROXIMITY DATA

BACKGROUND

As the functionality offered by computing devices continues to improve, users are utilizing these devices in different ways for an increasing variety of purposes. For example, certain devices include stereoscopic cameras that are able to capture stereoscopic images that include disparity information, enabling those images to appear to be three-dimensional when properly rendered. In order for the relative distances of objects in the image to appear correctly, the cameras need to be adequately aligned such that the apparent disparity is accurate for the actual distance of the object. While a calibration procedure can be used during the manufacture or testing process, it may be difficult to get users to recalibrate the cameras over time. Further, existing calibration approaches require placing specific calibration objects in specific locations and/or orientations, which can be confusing or at least not enjoyable for a user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for calibrating image capture elements. In particular, various embodiments enable a computing device to automatically perform a recalibration process after the device has left the manufacturer and/or is in the possession of a user. At least some embodiments can utilize data from a proximity sensor to calibrate and/or account for misalignment of two or more cameras configured for capturing three-dimensional image data. For example, a computing device can detect the presence of an object, such as a hand or fingertip of a user, in stereoscopic image data captured by the device. The object will have an amount of disparity that indicates its apparent distance from the computing device. Since the cameras will generally be misaligned to some extent, and can become further misaligned through use over time, the disparity information may be inaccurate, resulting in imprecise distance determinations. In order to account for at least some of these misalignments, approaches in accordance with various embodiments can utilize at least one proximity sensor to obtain distance information for the object of interest. For example, the data from the proximity sensor can be used to determine the detected distance to the fingertip, within the accuracy of the proximity sensor. For that detected distance, the expected amount of disparity can be determined based at least in part upon the known geometry of the device. Differences between the expected and observed disparity values can then be used to adjust the calibration of the cameras, such that an object at that distance will have the proper amount of disparity in a subsequently captured stereoscopic image. In order to improve the calibration, additional cameras can be used and/or the object (or multiple objects) can be imaged at multiple locations (or in motion) in order to improve calibration over a range of distances.

Various other functions and advantages are described and suggested below as may be provided in accordance with the various embodiments.

Figure 1:
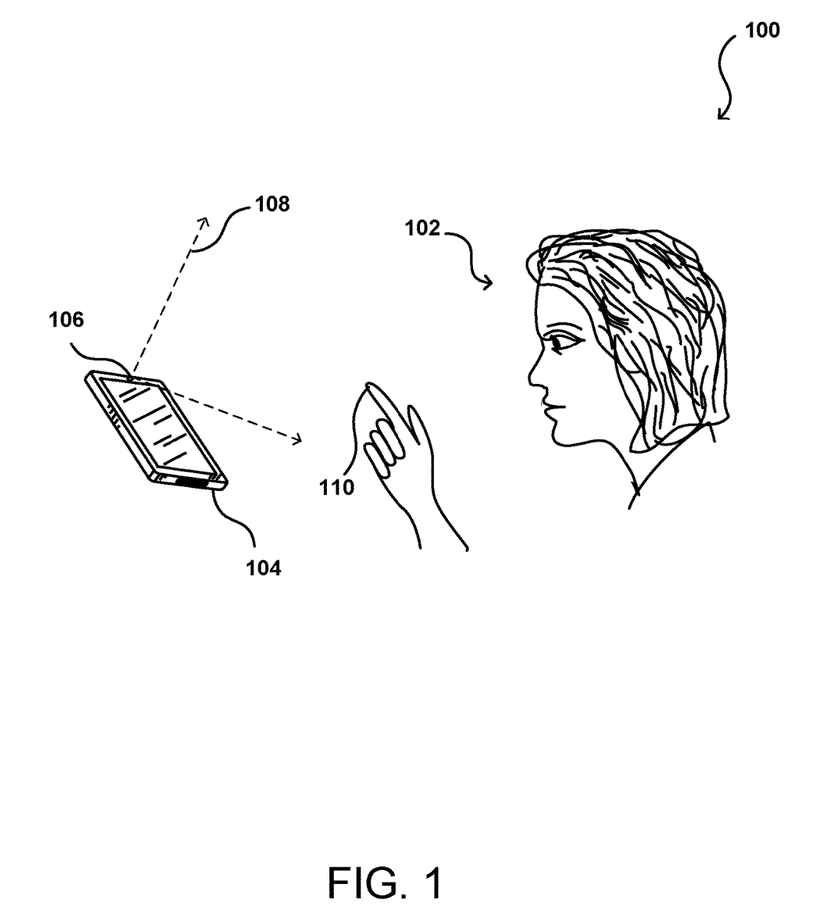
FIG. 1 illustrates an example of a user providing input to a computing device in accordance with various embodiments.

FIG. 1 illustrates an example situation 100 wherein a user 102 is attempting to provide input to a computing device 104 by positioning the user's fingertip 110 in a particular location with respect to the computing device. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, smart televisions, smart watches, smart glasses, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's fingertip 110, or is at least moving the finger towards the device to interact with the device (i.e., contact a touch screen, button, or key). If the motion is performed within a field of view 108 or angular range of at least one of the imaging elements 106 on the device, the device can capture image information including at least a portion of the user's hand (i.e., at least a fingertip if such feature is used to provide input), analyze the image information using at least one image analysis process, feature recognition process, or other such process or algorithm, and determine position and/or movement of at least one feature of the user for one or more frames or portions of the image information. This can be performed using any process known or used for recognizing and object and determining motion, such as by locating "unique" features in one or more initial images and then tracking the locations of those features in subsequent images, whereby the movement of those features can be tracked and/or compared against a set of movements corresponding to the motions or gestures, etc. In some embodiments, a display screen of the computing device can be a capacitive display allowing for contact or non-contact input by a user when a feature of the user (e.g., a fingertip) is within a detectable range (e.g., 3-5 cm.) of the display. Various approaches for determining position-, motion-, and/or gesture-based input can be found, for example, in co-pending U.S. patent application Ser. No. 12/332,049, filed Dec. 10, 2008, and entitled "Movement Recognition and Input Mechanism," which is hereby incorporated herein by reference.

In many instances, it can be desirable to capture motions and/or gestures in three dimensions. One approach for capturing such motions and gestures is to use stereoscopic imaging. In general, stereoscopic imaging is an approach wherein two cameras separated by a known distance, and with substantially parallel optical axes, each capture an image that, based on the separation of the cameras, will include representations of objects with slight offsets with respect to the other image. The amount of this offset, or the "disparity" between the location in each of the images, decreases with distance. Thus, based on the amount of disparity, the distance to that object can be calculated. Similarly, the distance to an object can be used to calculate the amount of disparity that should be represented in the stereoscopic image data.

Figure 2:
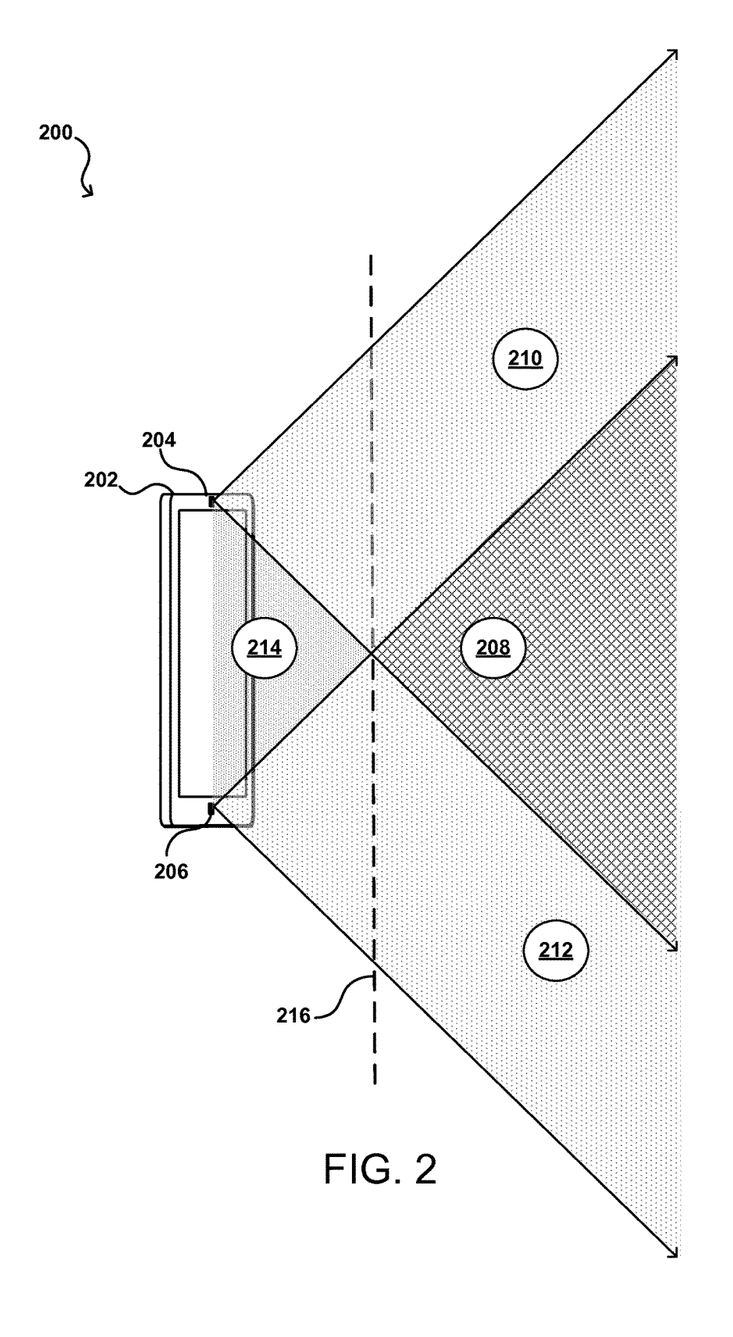
FIG. 2 illustrates an example situation wherein a pair of front-facing cameras of a computing device is capturing image information over respective fields of views, in accordance with various embodiments.

FIG. 2 illustrates an example situation 200 where two front-facing cameras 204, 206 of a computing device 202 are each capturing image information over a respective field of view. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 208 or region that is at least a determined distance 216 from the device 202. Any object (e.g., a user's face or other feature) that is located within the overlap zone 208 would be visible to both cameras 204, 206 such that the images from the cameras would be able to be analyzed to determine disparity information for the object. Using conventional stereo imaging approaches, anything closer to the device than this overlap zone 208 may not be able to have disparity information determined, as the object would be seen by at most one of the cameras. In other words, an object in a zone 214 close to the device and between the cameras 204, 206 may not be seen by either camera and thus may not be included in the disparity information. There may also be two zones 210, 212 where an object can only be seen by one of the cameras 204 or 206. If an object such as a user's finger moves into the overlap zone 208, the disparity information, or offset between the apparent position of the fingertip between images captured by the two cameras, can be used to determine the distance of the fingertip from the device (i.e., from a point halfway between the sensors of the cameras capturing the images).

Figure 3A:
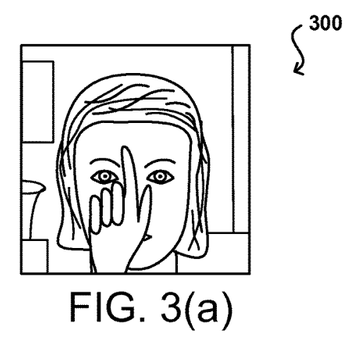
FIGS. 3(a), 3(b), and 3(c) illustrate example stereoscopic image data that can be captured in accordance with various embodiments.
Figure 3B:
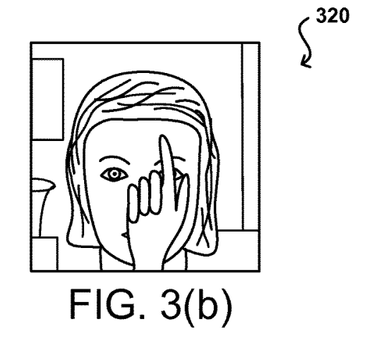
Figure 3C:
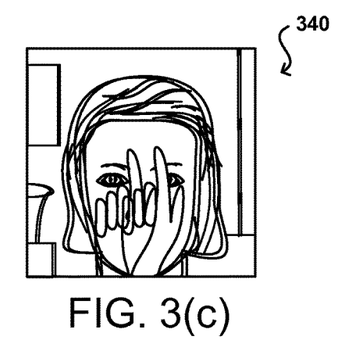

For example, FIGS. 3(a) and 3(b) illustrate images 300, 320 that could be captured using a pair of cameras (e.g., stereoscopic cameras) embedded in a computing device, such as those illustrated in FIG. 2. In various embodiments, the pair of cameras may capture the images simultaneously or substantially simultaneously and therefore would include at least some matching points of interest in their respective images. For example, the user's finger, nose, eyes, eyebrows, lips or other feature points may be identified by the computing device in both images by using any one of the feature detection algorithms mentioned above. FIG. 3(c) illustrates an example combination image 340 showing the relative position of various objects in the captured images 300, 320 if those images were "overlaid" or "superimposed" on top of each other. As illustrated, objects closest to the camera, such as the user's hand, have the greatest amount of disparity, or lateral offset, between images. Objects farther away from the device, such as a painting on the wall, have relatively small amounts of disparity. Objects between these two areas will have intermediate amounts of disparity based upon the relative distance of those objects from the cameras. It should be understood that words such as "lateral" are used for purposes of simplicity of explanation and should not be interpreted to require a specific orientation unless otherwise stated, as devices can be used in any orientation and cameras or sensors can be placed at various locations on a device as appropriate.

Figure 4:
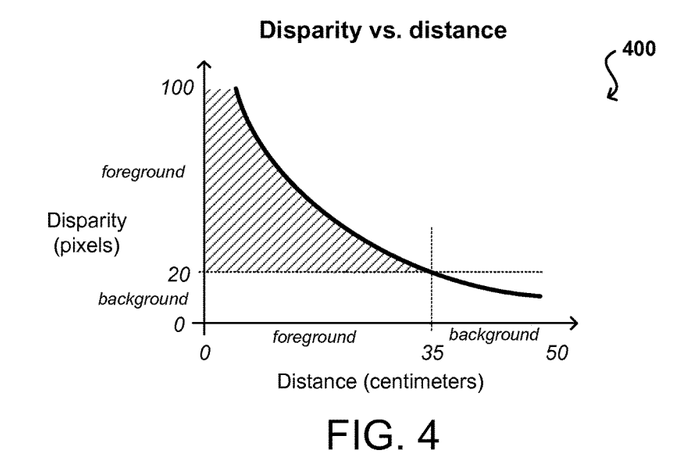
FIG. 4 illustrates an example plot showing a relationship of disparity with distance for an example stereoscopic imaging process that can be used in accordance with various embodiments.

FIG. 4 illustrates an example plot 400 showing a relationship of disparity with distance. As illustrated, the amount of disparity is inversely proportional to the distance from the cameras, such that there can be significantly more disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 400 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. Based on relationships such as this one, the computing device may be able to determine the distance between the object of interest and the device.

Figure 5A:
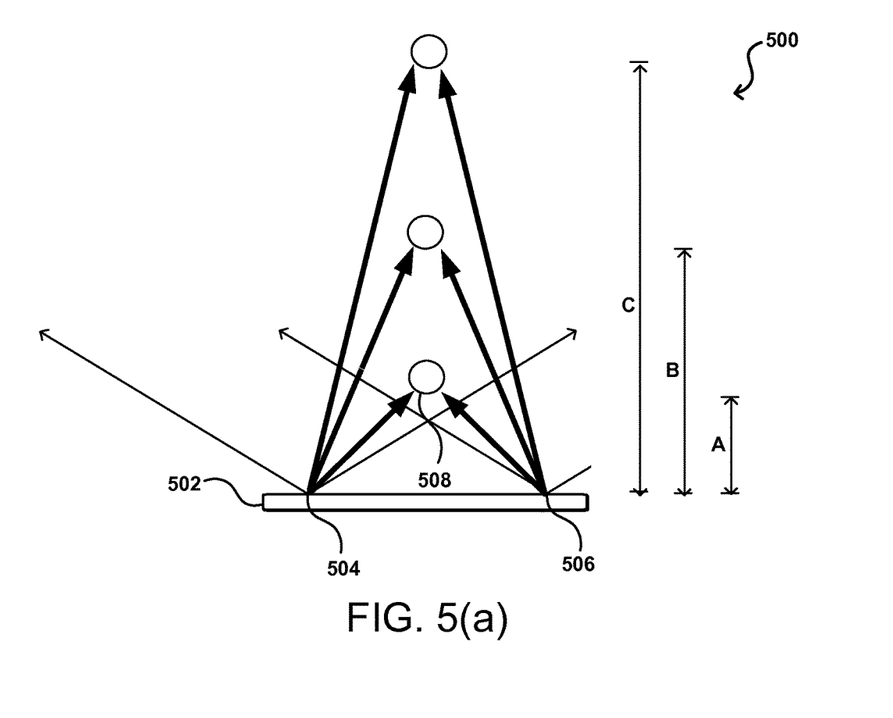
FIGS. 5(a) and 5(b) illustrate different disparities that can be determined for an object at different distances in accordance with various embodiments.
Figure 5B:
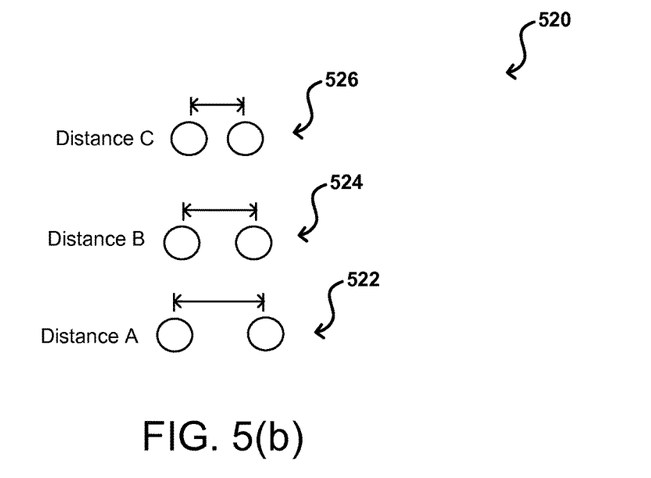

FIGS. 5(a) and 5(b) provide another illustration as to how disparity changes with distance. In the example 500 of FIG. 5(a), an object 508 has image information captured by a pair of cameras 504, 506 of a computing device 502 at three different distances A, B, and C. Example rays from the center of each camera to the object are displayed at each distance. As can be seen, the rays approach horizontal (in the plane of the figure) as the object gets closer to the cameras, meaning that the object will appear closer to an edge of an image captured by either camera. Similarly, as the object 508 gets farther away, such as at position C, the rays get closer to vertical, or closer to parallel with each other, meaning that the object will appear closer to the center of each image, or closer to the same position in each image (for off-center objects). For objects that are sufficiently far away, those objects can appear in substantially the same location in each image. FIG. 5(*b*) illustrates example separations or disparities 522, 524, 526 that could be expected for each of distances A, B, and C, respectively, showing a decrease in offset with an increase in distance.

When the cameras are sufficiently aligned, such that the primary axes of the camera sensors (orthogonal to the primary plane of the respective sensor) are sufficiently parallel, the disparity information can be used to determine the distance to an object. For example, the amount of disparity 524 for an object in stereoscopic image data can indicate that the object is at a distance of B if the cameras are sufficiently aligned. A problem arises, however, when the cameras become misaligned. For example, consider one of the cameras 506 in FIG. 5(*a*). If that camera becomes misaligned such that the camera sensor is somewhat rotated with respect to what is shown in the figure, the ray to distance B, for example, will be at a different angle with respect to that angled camera sensor. This can cause the object 508 to appear at a slightly different location in the image captured by that camera 506, which then can change the amount of disparity for that object in the corresponding stereoscopic image data. Thus, any misalignment can create errors in disparity, which can result in improper determinations of distance based on those errors.

Accordingly, approaches in accordance with various embodiments can utilize a proximity sensor, or other such distance determining sensor or component, to determine the detected distance to an object, which then can be compared to the distance determined for that object using stereoscopic images to determine an amount of error in the determination due to misalignment of one or more of the cameras. The correction in disparity data can be used to determine at least a combined or relative misalignment among the cameras, which then can be used to calibrate one or more of the cameras using calibration parameters or processes as would be used in the manufacture or testing of the cameras. In some embodiments, the information can also, or alternatively, be used in post-processing to adjust the disparity of objects in subsequently captured stereoscopic images, such as by adjusting the disparity by different amounts for objects at different distances. By knowing the geometry of the device, a known misalignment angle will produce a known error in disparity values over a range of distances, such that the disparity of objects in captured images can be corrected either as stored or upon rendering, among other such options.

Figure 6:
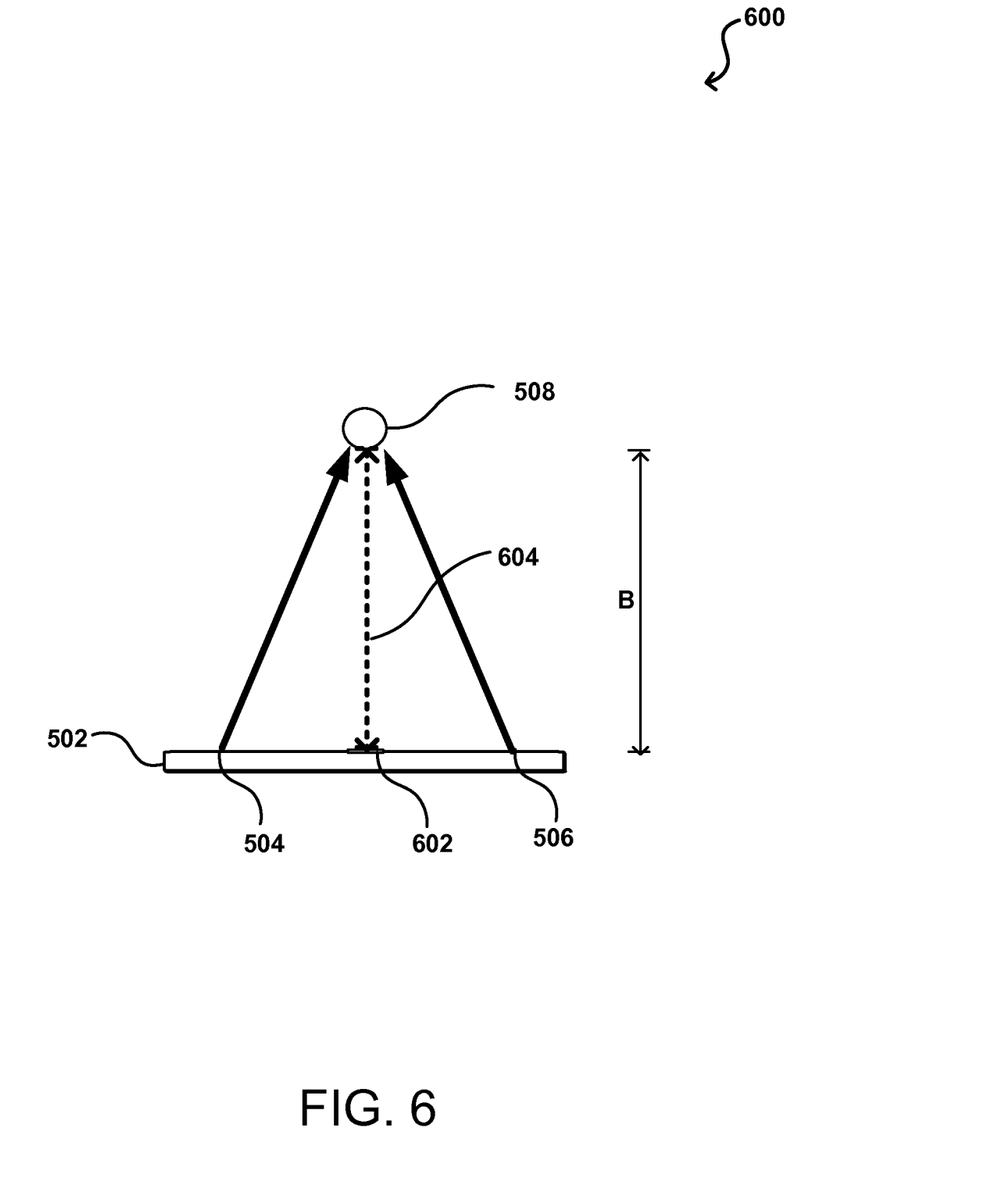
FIG. 6 illustrates an example approach using distance information from a proximity sensor to calibrate stereoscopic cameras used to obtain distance information.

For example, FIG. 6 illustrates an example situation 600 wherein proximity sensor data can be used to correct for misalignment errors of two or more cameras in accordance with various embodiments. It should be understood that reference numbers may be carried over between figures for purposes of explanation, but that this should not be viewed as a limitation on the various embodiments. In this example, a portion of the arrangement of FIG. 5(*a*) is illustrated, where two cameras 504, 506 of a computing device 502 capture an image showing an object 508 that is at a distance B. The computing device also includes at least one proximity sensor 602, which is configured to independently determine the distance to that object 508 at approximately the time of image capture by the pair of cameras 504, 506. The proximity sensor can provide distance information 604 for the object, which then can be compared against the apparent distance determined from the stereoscopic information. Alternatively, the detected distance can be used to determine an expected amount of disparity for the object 508 in the corresponding stereoscopic image, which can be compared against the observed disparity for that object in the image data. The difference in disparity for that distance then can be used to determine a relative misalignment between the cameras, which can be used with a recalibration procedure as discussed elsewhere herein.

The proximity sensor 602 can be any appropriate proximity sensor, or other such distance determining sensor or component (e.g., a capacitive or inductive photoelectric sensor, magnetic proximity fuse, radar, sonar, lidar, optical micrometer, and the like). For example, the proximity sensor can utilize ultrasonic pulses, infrared light, or an electromagnetic field, among other such options. The proximity sensor can use a time-of-flight approach in one embodiment, wherein a pulse of sound or light is emitted at a first time, and a portion of the pulse that is reflected by the object is detected at a second time. The difference between the first and second times can be used, given the approximate transmission speed of the pulse, to determine the approximate distance of the object, such as to within a centimeter or a millimeter for certain sensors.

As discussed, for a given separation and geometry of the cameras on the device, a determination of the angle (with respect to the normal of the camera sensor) of the object can be determined for a given distance and/or amount of disparity. This can be given by, for example (and assuming a lateral position between the cameras for convenience):

$$\sin(\theta) = \frac{0.5 * s}{d},$$

where θ is the angle with respect to normal, s is the amount of disparity (with a factor of 0.5 here for each camera on average), and d is the distance to the object. Thus, if the actual distance is determined one can also determine the amount of disparity that should be present in the stereoscopic image data. Thus, to calculate the average misalignment of each camera, a formula can be used such as the following:

$$\theta' = \arcsin\left(\frac{0.5 * (s - s')}{d}\right),$$

where θ' is the relative angle of misalignment of each camera, s is the expected disparity and s' is the apparent disparity from the stereoscopic data. The error in disparity data is then represented by (s-s'), where the sign (i.e., positive or negative) or the result indicates the direction of the angular misalignment.

Figure 7:
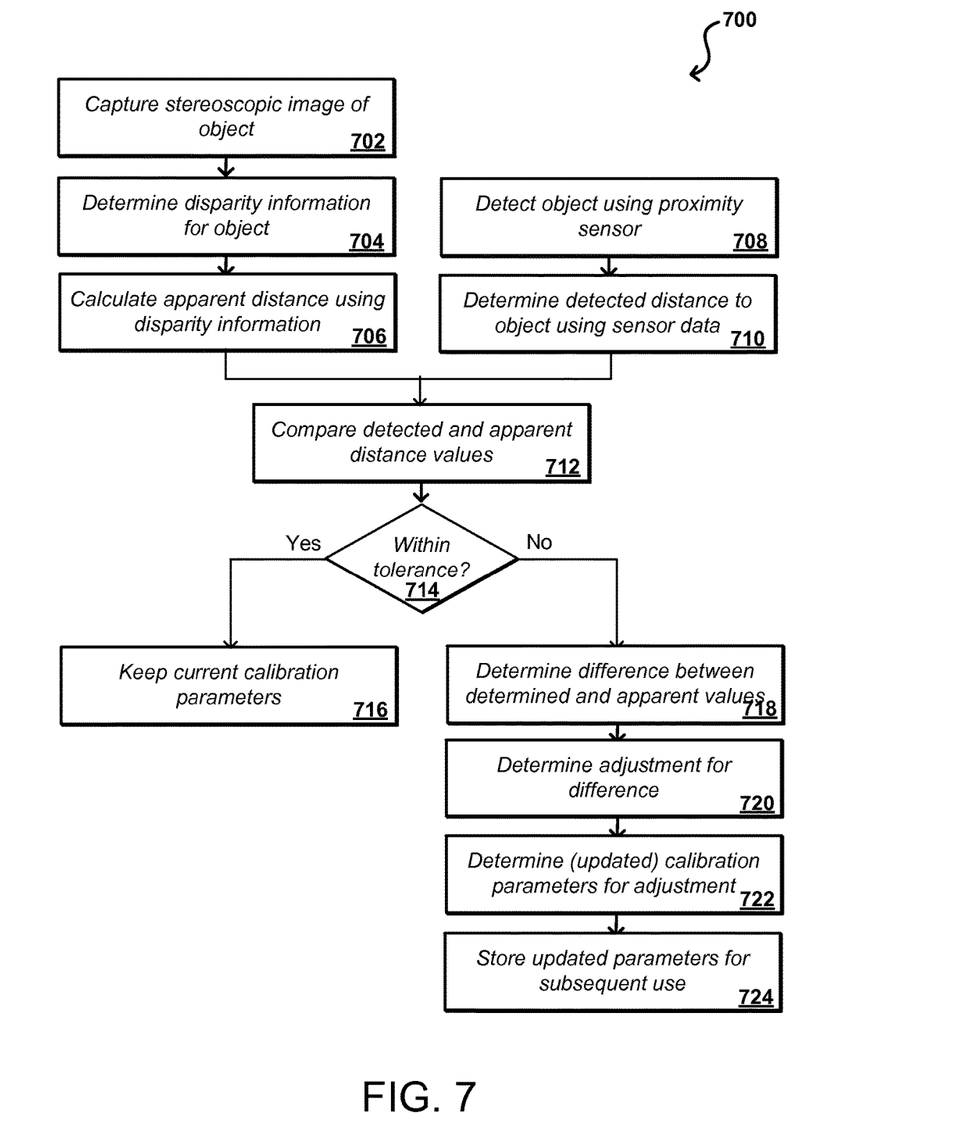
FIG. 7 illustrates an example process for calibrating stereoscopic cameras that can be utilized in accordance with various embodiments.

FIG. 7 illustrates an example process 700 for calibrating two or more cameras of a computing device that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. Further, the entire process can be performed on a single device in some embodiments, while at least portions of the process can be performed using one or more other computing devices, such as a remote server, in accordance with various embodiments. In this example, stereoscopic data and proximity data are captured concurrently, and as close to simultaneously as possible in at least some embodiments, in order to reduce the effects of motion of an object or the computing device on the distance determinations. For example, at least one stereoscopic image of an object is obtained 702 for at least one time or distance. The object can be located and/or recognized in the stereoscopic image data using at least one feature or object recognition process as discussed elsewhere herein. Using at least one representative point of the object in the image data, an amount of disparity for the object in the stereoscopic image data can be determined 704. An apparent distance between the object and the computing device can then be calculated 706 using information about the geometry of the device as discussed elsewhere herein. Concurrently, or at approximately the same time, the object can be detected 708 using at least one proximity sensor of the device. The detected distance to the object from the device can then be determined 710 using the proximity data from the proximity sensor. It should be understood that this approach compares apparent and detected distances, but other approaches could compare expected and observed amounts of disparity as discussed elsewhere herein, among other such approaches.

The detected distance value from the proximity data can be compared 712 against the apparent distance calculated using the disparity data. It should be understood that the distances may not be directly compared, based at least in part upon the geometry of the device. For example, if the proximity sensor is placed precisely between the two cameras (i.e., equidistant and along an imaginary line between the centers of the two camera sensors) then the distances can be directly compared, but if the proximity sensor is located elsewhere then a calculation can be performed on at least one of the apparent distance or the detected distance values such that distances along the same imaginary line segment between the object and the device are being compared. A determination then can be made 714 as to whether these values agree, such as whether the values are within an allowable amount, range, or threshold of deviation from each other. In some embodiments, each of the values may have an uncertainty or amount of error, and the values can be determined to agree if the values fall within those amounts of error or uncertainty. If the values agree, the current calibration parameters can be determined to be sufficient and kept 716 for use with subsequent image capture. It should be mentioned that, in at least some embodiments there might be different types of calibration parameters, such as persistent parameters or baseline settings from the time of manufacture, as well as persistent and/or cyclical parameters determined from calibration processes such as those discussed herein.

If, however, the apparent and actual detected distance values differ by more than an allowable amount, an attempt can be made to determine, and correct for, an amount of misalignment among the cameras. In this example, a determination of the relative misalignment among the cameras is determined 718 using the difference between the apparent and actual detected distance values (or the expected and actual observed disparity values). An adjustment for the difference is determined 720, and one or more updated calibration parameters are then determined 722 to account for the relative misalignment. The process for determining and applying calibration parameters can be similar to a known or conventional process that can be used to initially calibrate the cameras at time of manufacture or testing using a calibration object, or another such process. The updated calibration parameter(s) can be stored 724 for use in capturing (or processing) subsequent stereoscopic images. The process can repeat, either continuously or at specific times as discussed elsewhere herein, such that the calibration parameters can be updated as appropriate.

In some embodiments, the automatic calibration process can look for specific types of features or objects, such as a finger, hand, head, or stylus. In other embodiments the process can look for any object that is within a sufficient range of the device, and in an appropriate relative position. In at least some embodiments, the process can also attempt recalibration when no other object is near the object in the appropriate relative position, such that any proximity data from the proximity sensor can easily be correlated with the object of interest. In some embodiments, the process can look for an object making a path over a range of distances, such as a finger being brought toward the screen or a hand of a user reaching for the device, in order to make misalignment error determinations at multiple distances, in order to improve the results of the misalignment calculation. In some embodiments the device might prompt the user to make a motion, such as to move a fingertip towards the screen, in order to attempt to ensure that the recalibration process is executed for a specific type of object or action.

Recalibration can be performed at any appropriate time. For example, recalibration can be done at substantially regular intervals, after a number of images have been captured, or each time stereoscopic imaging is activated. In some embodiments, a process can determine when disparity information is likely incorrect, or when other such errors or discrepancies are noticed, and can activate recalibration at that time. In some embodiments, a sensor such as an accelerometer or inertial sensor can detect an intense movement, such as a device being dropped or otherwise jarred, such that a small misalignment might have occurred. Various other approaches can be used as well. Recalibration using approaches discussed herein can be relatively non-intrusive and low-cost from a processing and power standpoint such that such a process can be performed relatively frequently.

As discussed, multiple cameras might be positioned on a device and able to capture stereoscopic images. If possible, utilizing some or all of these cameras concurrently to capture images of an object and make misalignment calculations can improve accuracy. Similarly, if a device has multiple proximity sensors it can be advantageous to utilize those sensors concurrently to improve distance determinations. As discussed, if only a single proximity sensor is available then it can be advantageous, in at least some circumstances and/or embodiments, to take multiple samples in order to ensure proper disparity information about misalignment adjustment calculations.

Figure 8:
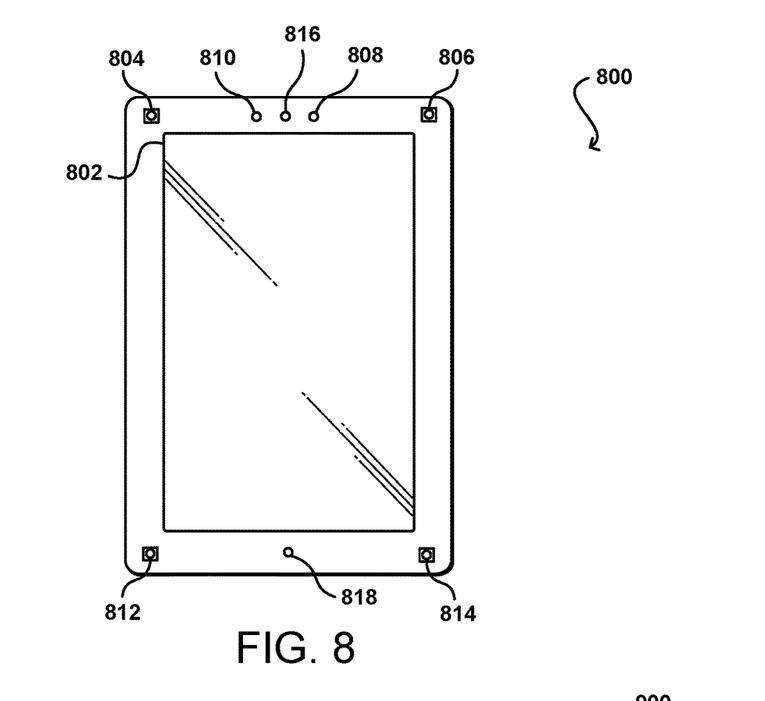
FIG. 8 illustrates an example portable computing device that can be used in accordance with various embodiments.

FIG. 8 illustrates an example computing device 800 that can be used to perform methods in accordance with various embodiments discussed and suggested herein. In this example, the device has four image capture elements 804, 806, 812, 814 positioned at various locations on the same side of the device as a display element 802, enabling the device to capture image information about a user of the device during typical operation where the user is at least partially in front of the display element. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices. The computing device also includes a pair of proximity sensors 816, 818 operable to determine distance information for objects in front of, but separated a distance from, the display element 802.

In this example, a light sensor 808 is included that can be used to determine an amount of light in a general direction of objects to be captured and at least one illumination element 810, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 9:
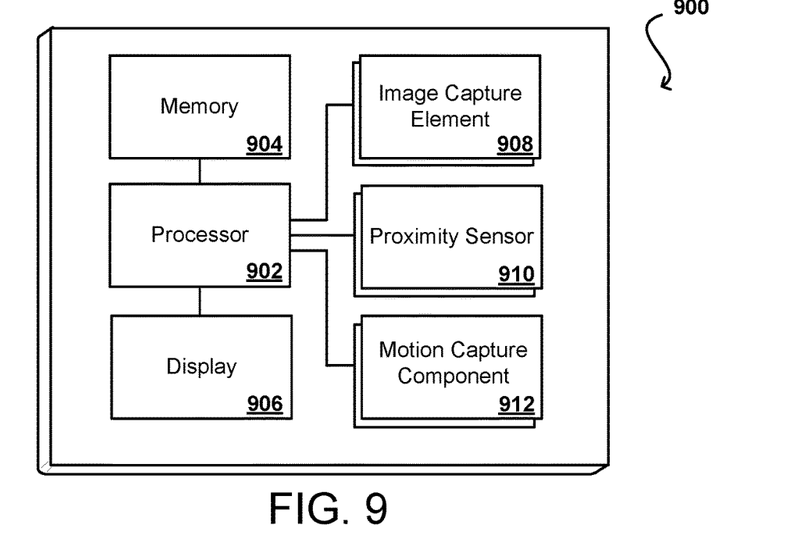
FIG. 9 illustrates an example set of basic components of a portable computing device, such as the device described with respect to FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least two image capture elements 908, such as two or more cameras (or at least one stereoscopic camera) that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example computing device includes at least one proximity sensor 910 which can provide distance data to the processor for use in calibrating one or more of the image capture elements 908. The example device 900 includes at least one motion determining component 912, such as an electronic gyroscope used to determine motion of the device for assistance in input determination. As discussed, such a sensor can be used to detect certain motion of the device that might result in camera misalignments, such that a calibration procedure can be executed. The device also can include at least one illumination element, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 10:
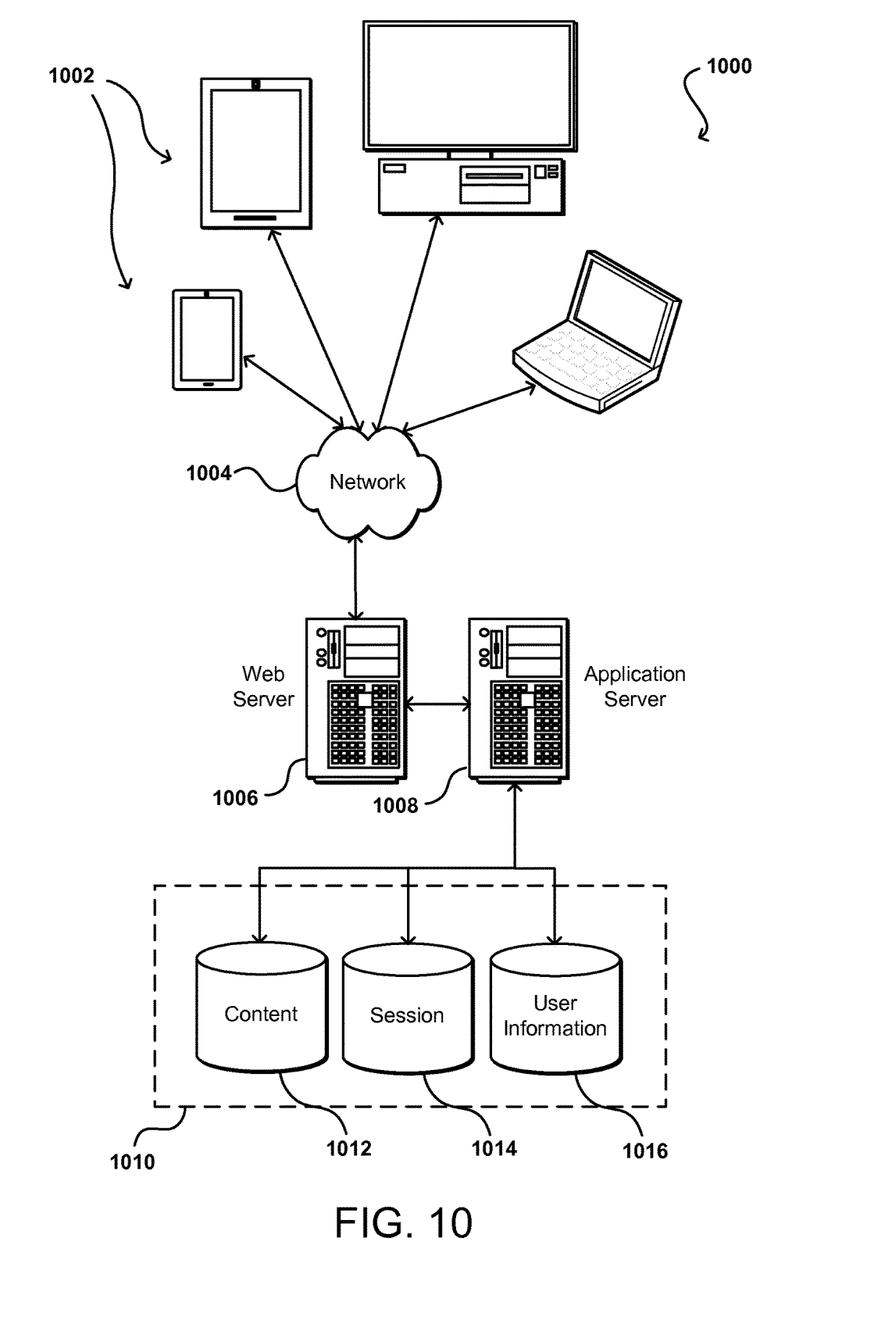
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a first camera;
   a second camera;
   a proximity sensor;
   at least one processor; and
   memory including instructions that, when executed by the at least one processor, cause the computing device to:
      concurrently capture a first image of an object using the first camera and a second image of the object using the second camera;
      determine an apparent disparity, in pixels, between at least a portion of the object represented in the first image and the portion of the object represented in the second image;
      determine an apparent distance between the computing device and the object based on the apparent disparity;
      measure, by the proximity sensor, a detected distance between the computing device and the object;
      determine an expected disparity, in pixels, between the portion of the object represented in the first image and the portion of the object represented in the second image based on the detected distance;
      determine a relative misalignment value for at least one of the first camera or the second camera that corresponds to a difference between the apparent disparity and the expected disparity; and
      obtain, based at least in part on the relative misalignment value, one or more calibration parameters for at least one of the first camera or the second camera when the difference is equal to, or greater than, a threshold disparity value, wherein the one or more calibration parameters are used to compute a second apparent distance between the computing device and a second object.

2. The computing device of claim 1, wherein the instructions when executed further cause the computing device to: determine no other objects are located within the detected distance between the computing device and the object or within a field of view of each of the first camera and the second camera.

3. The computing device of claim 1, wherein the instructions when executed further cause the computing device to:
   concurrently capture a third image of the second object using the first camera and a fourth image of the second object using the second camera;
   determine, the second apparent distance between the computing device and the second object based on the one or more calibration parameters and a second apparent disparity, in pixels, between at least a portion of the second object represented in the first image and the portion of the second object represented in the second image;
   measure, by the proximity sensor, a second detected distance between the computing device and the second object;
   determine a second expected disparity, in pixels, between the portion of the object represented in the first image and the portion of the object represented in the second image based on the second detected distance; and
   determine, one or more second calibration parameters for at least one of the first camera or the second camera based on a difference between the apparent disparity and the expected disparity.

4. A method, comprising:
   capturing stereoscopic image data using at least a first camera and a second camera of a computing device, the stereoscopic image data includes first image data associated with the first camera and second image data associated with the second camera;
   determining an apparent disparity, in pixels, between at least a portion of an object represented in the first image data and the second image data;
   determining an apparent distance between the computing device and the object based on the apparent disparity;
   determining an expected disparity, in pixels, between the portion of the object represented in the first image data and the second image data based on a detected distance between the computing device and the object as measured by a proximity sensor of the computing device;
   determining a relative misalignment value for at least one of the first camera or the second camera based on a difference between the apparent disparity and the expected disparity; and
   determining at least one calibration parameter for at least one of the first camera or the second camera based on the relative misalignment value.

5. The method of claim 4, further comprising:
   identifying the object in the stereoscopic image data.

6. The method of claim 4, wherein the object includes at least one of a hand, a finger, a head, or an object held by a user.

7. The method of claim 4, further comprising:
   recognizing the object as being in motion toward the device before determining the relative misalignment value, wherein the relative misalignment value is determined for at least two positions of the object while the object is moving toward the computing device.

8. The method of claim 4, wherein the at least one calibration parameter includes an angular misalignment of at least one of the first camera or the second camera.

9. The method of claim 5, further comprising:
determining the at least one calibration parameter as part of an automatic calibration process on the computing device.

10. The method of claim 9, further comprising:
executing the automatic recalibration process by one or more of a continuous schedule, a relatively fixed interval schedule, in response to activation of an image capture function, or after a type of motion experienced by the computing device.

11. The method of claim 4, further comprising:
determining no other objects are located within the detected distance between the computing device and the object or within a field of view of the first camera and the second camera.

12. A non-transitory computer readable storage medium storing instructions that, when executed by one or more processors of a computing device, cause the computing device to:
capture image data using at least a first camera and a second camera of the computing device, the image data includes first image data associated with the first camera and second image data associated with the second camera;
calculate an apparent disparity, in pixels, between at least a portion of an object represented in the first image data and the second image data;
determine an apparent distance between the computing device and the object based on the apparent disparity;
calculate an expected disparity, in pixels, between the portion of the object represented in the first image data and the second image data based on a detected distance between the computing device and the object as measured by a proximity sensor of the computing device; and
determine at least one calibration parameter for one of the first camera or second camera based on a difference between the apparent disparity and the expected disparity.

13. The non-transitory computer readable storage medium of claim 12, wherein the apparent disparity relates to a difference in location of the portion of the object between the first image data and to the second image data.

14. The non-transitory computer readable storage medium of claim 12, wherein the instructions when executed, further cause the computing device to:
prompt a user of the computing device to move the object in a determined motion with respect to the computing device.

15. The non-transitory computer readable storage medium of claim 12, wherein the detected distance is a first detected distance, wherein the instructions when executed, further cause the computing device to:
determine a second detected distance between the computing device and the object using at least one additional proximity sensor on the computing device, wherein the second detected distance is used to improve an accuracy of the first detected distance.

16. The non-transitory computer readable storage medium of claim 12, wherein the wherein the instructions, when executed, further cause the computing device to:
determining the at least one calibration parameter as part of an automatic calibration process; and
executing the automatic calibration process by one or more of a continuous schedule, a relatively fixed interval schedule, in response to activation of an image capture function, or after a type of motion experienced by the computing device.

17. The non-transitory computer readable storage medium of claim 16, wherein the instructions when executed further cause the computing device to:
determine no other objects are located within the detected distance between the object and the proximity sensor or within a field of view of each of the first camera and the second camera.

18. The non-transitory computer readable storage medium of claim 12, wherein the at least one calibration parameter includes an angular misalignment of at least one camera.

19. The non-transitory computer readable storage medium of claim 12, wherein the instructions when executed further cause the computing device to:
identify the object represented in the first image data and the second image data when the object matches an object type of interest.

* * * * *